United States Patent [19]

Morinaga et al.

[11] 4,151,226
[45] Apr. 24, 1979

[54] PROCESS FOR PRODUCING THERMOPLASTIC RESIN HIGHLY RESISTANT TO IMPACT AND WEATHER

[75] Inventors: Takashi Morinaga, Hitachi; Yasuyuki Okano, Ichihara; Koichi Kakefuda; Kiyoyuki Suzue, both of Hitachi, all of Japan

[73] Assignee: Hitachi Chemical Company, Ltd., Japan

[21] Appl. No.: 304,341

[22] Filed: Nov. 7, 1972

[30] Foreign Application Priority Data

Nov. 17, 1971 [JP] Japan ................................ 46/91516

[51] Int. Cl.$^2$ ............................................. C08L 33/00
[52] U.S. Cl. ............................. 260/881; 260/17.4 G; 260/17.4 C; 260/882; 260/884; 260/885; 260/876 R
[58] Field of Search ............... 260/17.4 G, 17.4 C, 260/881, 884, 885

[56] References Cited

U.S. PATENT DOCUMENTS

| | | | |
|---|---|---|---|
| 3,448,173 | 6/1969 | Ryan et al. | 260/876 R |
| 3,450,796 | 6/1969 | Griffin | 260/885 |
| 3,711,575 | 1/1973 | Kakefuda et al. | 260/881 |

*Primary Examiner*—Richard B. Turer
*Attorney, Agent, or Firm*—Craig & Antonelli

[57] ABSTRACT

A process for producing a thermoplastic polymer highly resistant to impact and weather by graft-copolymerizing, in the presence of a water-soluble polymer and a radical polymerization initiator in an aqueous medium, [B] 90 to 60 parts by weight of a monomer mixture comprising 30 to 100% by weight of an aromatic vinyl compound (for example, styrene) and 0 to 70% by weight of acrylonitrile plus methyl methacrylate in which the proportion of acrylonitrile is 20 to 100% by weight and that of methyl methacrylate is 80 to 0% by weight, on [A] 10 to 40 parts by weight (in terms of solids content) of a rubbery copolymer latex obtained by copolymerizing in an aqueous emulsion a mixture comprising [I] 60 to 99.9% by weight of at least one alkyl acrylate (for example, butyl acrylate) having 1 to 13 carbon atoms in the alkyl group, [II] 0 to 20% by weight of at least one vinyl compound copolymerizable with [I] (for example, styrene) and [III] 0.1 to 20% by weight of at least one organic polyallyl compound copolymerizable with [I] (for example, triallyl isocyanurate), which is characterized by previously subjecting the reaction system to a mechanical mixing treatment (mixing by means of, for example, an ordinary agitator, homogenizer, or colloid mill) and then conducting said graft-copolymerization.

24 Claims, No Drawings

PROCESS FOR PRODUCING THERMOPLASTIC RESIN HIGHLY RESISTANT TO IMPACT AND WEATHER

This invention relates to a process for producing a thermoplastic resin excellent in impact, weather and heat resistance and having favorable moldability and high rigidity.

As impact resistant molding materials, there are well known thermoplastic resins such as high impact polystyrene and ABS resins. However, these resins are inferior in weather resistance and on exposure to ultraviolet rays deteriorate markedly in mechanical properties accompanied generally by changes in surface appearance, losing in gloss while gaining in discoloration. For this reason, the said thermoplastic resins have been limited to exterior uses only. In order to improve the weather resistance of such butadiene rubber-reinforced thermoplastic resins, the present inventors had previously developed a thermoplastic resin having improved weather and impact resistance, which contains a rubber component derived from an acrylic ester in place of butadiene. However, the thermoplastic resin thus obtained is still inferior to the ABS resin, etc. in impact strength. In order to improve the impact strength to the same level, the rubber content had to be increased, thus resulting in slight decrease in rigidity and hardness. The increase in rubber content also posed a problem on moldability.

The object of this invention is to enhance the impact strength without impairing the weather resistance, thereby reducing the rubber content and improving the above-mentioned rigidity and moldability.

The present inventors conducted extensive research on the above-mentioned enhancement of impact strength and improvement of rigidity and moldability. As a result, it has been found that a thermoplastic resin composition having a markedly enhanced impact strength and an improved rigidity and moldability can be obtained by a process for graft-copolymerizing [B] 90 to 60 parts by weight of a monomer mixture comprising 30 to 100% by weight of an aromatic vinyl compound such as styrene and 70 to 0% by weight of acrylonitrile plus methyl methacrylate in which the proportion of acrylonitrile is 20 to 100% by weight and that of the latter is 0 to 80% by weight, on [A] 10 to 40 parts by weight (in terms of solids content) of a rubbery copolymer latex obtained by copolymerizing in an aqueous medium 60 to 99.9% by weight of at least one alkyl acrylate in which the alkyl group has, preferably, 1 to 13 carbon atoms, such as butyl acrylate, with 40 to 0.1% preferably 10 to 0.1% by weight of at least one copolymerizable organic polyallyl compound, in the presence of a water-soluble polymer and a radical polymerization initiator in an aqueous medium, which is characterized by subjecting the reaction system prior to the graft-copolymerization to a mechanical mixing and then conducting said graft copolymerization. Thus, this invention has three essential requirements which are (1) obtaining a rubbery copolymer excellent in elasticity and toughness by copolymerizing an acrylic ester with a copolymerizable organic polyallyl compound, (2) graft copolymerizing styrene and/or acrylonitrile and/or methyl methacrylate on said rubbery copolymer latex in the presence of a water-soluble polymer, and (3), prior to said graft-copolymerization, subjecting the reaction system to a mechanical mixing pretreatment. By a synergistic effect of the three requirements, can a thermoplastic resin be obtained having a markedly high impact strength and rigidity, and no satisfactory result would be expected if any one of said three requirements is omitted.

The organic polyallyl compounds used in preparing the rubber copolymer act as a crosslinking agent for the acrylic ester, and provide grafting active sites in the graft copolymerization, whereby favorable results are obtained. Such effects result from the fact that the allyl group is very easily reacted with a radical, which enables the effective crosslinking reaction in polymerization into the rubbery copolymer. Further, the remaining allyl groups provide effective grafting active sites in the graft copolymerization, since a radical chain transfer to the residual allyl groups easily takes place. The organic polyallyl compounds used include triallyl cyanurate, triallyl isocyanurate, diallyl phthalate, diallyl isophthalate, diallyl terephthalate, triallyl trimellitate, diallyl trimellitate, tetraallyl pyromellitate, triallyl pyromellitate, diallyl pyromellitate, diallyl maleate, diallyl fumarate, diallyl adipate, etc., whereas those organic polyallyl compounds which are unable to copolymerize with an acrylic ester, such as triallylamine, diallylamine, and diallyl sulfide are, of course, excluded from the scope of this invention. The amount of the organic polyallyl compound used should be such that 0.1 to 20%, preferably 0.5 to 10%, by weight of the compound based on the total weight of the monomer mixture. When the amount is less than 0.1% by weight, the polyallyl compound cannot show a sufficient crosslinking effect, and when the amount is more than 20% by weight, it adversely affects the rubber elasticity. The organic polyallyl compounds may be used alone or in combination of two or more.

The alkyl acrylates used are those which contain an alkyl group having 1 to 13, preferably 4 or less, carbon atoms.

In the polymerization into the rubbery copolymer [A], a part of the alkyl acrylate may be replaced by at least one vinyl compound copolymerizable with the acrylic ester, such as, for example, styrene, acrylonitrile, or methyl methacrylate. In such a case, the proportion of the vinyl compound is 30% by weight or less, preferably 20% by weight or less based on the total weight of the monomer mixture.

Polymerization initiators which are used in conventional emulsion polymerization may be used in the present polymerization in such an amount as used in a conventional emulsion polymerization. Examples of suitable initiators include redox-type initiators composed of persulfate-sodium sulfite or cumene hydroperoxide-sodium formaldehyde-sulfoxylate.

Emulsifiers may be used in such an amount as used in a conventional emulsion polymerization. The emulsifiers used include anionic emulsifiers such as sodium oleate, sodium laurylsulfate, and the like. Nonionic emulsifiers may also be used alone or in combinations with the anionics.

Since it is not desired that after the polymerization into the rubbery copolymer [A], there remain unreacted acrylates and polyallyl compounds in large amounts, the polymerization conditions, such as temperature, time and the like should be controlled so that the conversion may be as high as possible.

The desired resin is obtained by graft-copolymerizing styrene, acrylonitrile and methyl methacrylate on the aforesaid rubbery copolymer in the presence of a water-soluble polymer after these materials have been subjected to a mechanical mixing.

When graft-copolymerization is conducted in the presence of a water-soluble polymer as an adsorption protective layer, the polymerization proceeds in the form of emulsion polymerization at the initial stage, and with the progress of polymerization, the polymer particles formed grow. When the conversion reaches a certain value (70 to 80%), it finally becomes impossible to maintain the emulsion state and inter-particle agglomeration begins to take place to transform the emulsion polymerization into suspension polymerization. At this stage, it is particularly important that the polymerization system has been subjected to a mechanical mixing treatment under suitable conditions prior to the polymerization. Such mechanical pretreatment has the following advantages: Upon mechanically forced contact, the rubbery copolymer [A] is swollen with the monomer mixture [B], whereby a polymer of the mixed monomer is formed inside the rubbery polymer particles and the compatibility of the rubbery copolymer with the resin component (i.e., graft-polymerized component) is enhanced; with monomers during polymerization is facilitated to increase the degree of grafting, resulting in enhancement of compatibility. The term "mechanical mixing" referred to above means mixing by means of conventional stirrers and emulsifying devices such as homogenizer, colloid mill, and the like, and suitable conditions are required in order to obtain optimum results.

In general, the protective effect of a water-soluble polymer is, unlike that of a surface active agent, the highest when a single phase is formed, and under conditions other than those for the formation of the single phase, the system becomes rather unstable, and thickening phenomenon results. When polymerization is conducted under such conditions, no desirable result will be obtained because of the excessive growth of particles of the rubbery polymer latex. Thus, the aforesaid suitable mechanical mixing means such mixing conditions as to form a stable single protective phase and its effect may be expressed in terms of phase separation rate (defined hereinafter) and viscosity behavior. For example, the results obtained by use of T. K. Homomixer as an emulsifying equipment were as shown in Table 2, from which it can be seen that a polymer with excellent characteristics is obtained from polymerization in the stable dispersion state at a low phase separation rate and a low viscosity.

Depending upon the type of emulsifying equipments, the optimum conditions should be selected for each, but it is clear that they can be settled by means of the phase separation rate and the viscosity behavior. The graft-polymerization temperature is preferably 60° C. or more to sufficiently swell the rubbery copolymer with the monomer mixture.

The water-soluble polymers for use in graft-polymerization include methylcellulose, carboxymethylcellulose, hydroxyethylcellulose, polyvinyl alcohol, partially hydrolyzed polyvinyl alcohol (polymerization degree, 1,000 to 2,000; saponification degree, 80 to 90%), sodium polyacrylate, and polyacrylic acid. These may be used alone or in combination. The amount of water-soluble polymer used is preferably 0.05 to 5% by weight based on the weight of the monomers though may be varied depending upon the type and amount of emulsifier and the type of water-soluble polymer used.

When the graft polymerization is conducted in the presence of the aforesaid water-soluble polymer, a polymer having a high impact strength may be obtained as mentioned above, and, in addition, the after treatment is simplified because of transformation into suspension polymerization which makes such a salting-out step as in emulsion polymerization unnecessary. The suitable monomer mixture for graft polymerization consists of 30 to 100% by weight of an aromatic vinyl monomer such as styrene, α-methylstyrene, α-ethylstyrene, or their nucleus-substituted derivatives, for example, vinyltoluene, chlorostyrene or the like, and 0 to 70% by weight of acrylonitrile plus methyl methacrylate in which the proportion of the former to the latter is 20 to 100:80 to 0 by weight. As the polymerization initiators for graft-copolymerization, there may be used those which are used in synthesizing the aforesaid rubbery copolymer and/or oil-soluble polymerization initiators such as lauroyl peroxide, benzoyl peroxide, azobisisobutyronitrile, and the like, in the same amount as in the production of the rubber copolymer.

In order to obtain a suitable degree of polymerization, it is possible to use a chain transfer agent, such as tert-dodecyl mercaptan or the like (ordinarily 1% by weight or less based on the monomers used).

The invention is illustrated below in further detail with reference to Examples, in which all parts are by weight.

EXAMPLE 1

| Recipe | | |
|---|---|---|
| Component I | | |
| Potassium persulfate | 0.8 | parts |
| Sodium sulfite | 0.16 | " |
| Sodium oleate | 17.6 | " |
| Deionized water | 1600 | " |
| Component II | | |
| Butyl acrylate | 784 | parts |
| Triallyl isocyanurate | 15.2 | " |
| Component III | | |
| Partially hydrolyzed polyvinyl alcohol having a saponification degree of 80±1.5% and a degree of polymerization of 1,700 (KH-17 produced by the Nippon Synthetic Chemical Industry Co.) | 3.6 | parts |
| Deionized water | 850 | " |
| Rongalite | 2.1 | " |
| Component IV | | |
| Styrene | 450 | parts |
| Acrylonitrile | 150 | " |
| Lauroyl peroxide | 1.8 | " |
| tert-Dodecyl mercaptan | 1.5 | " |
| Cumene hydroperoxide | 2.1 | " |
| Component V | | |
| Partially hydrolyzed polyvinyl alcohol (KH-17) | 1.6 | parts |
| Deionized water | 800 | " |

Polymerization procedure

Components I and II, each dissolved uniformly, were charged in a reactor, heated to 60° C. after replacement of the air therein by nitrogen while stirring, and allowed to react for 4 hours. The temperature was further elevated to 80° C. and the reaction was continued for a further 3 hours. After completion of the polymerization, the contents were cooled to obtain a butyl acrylate rubber latex [A]. Components III and IV, each dissolved uniformly, were charged into another reactor and homogenized with stirring. The latex [A] was added to the reactor until the concentration became 18% by weight in terms of solids content and mixing was effected by means of T. K. Homomixer (the voltage applied was regulated to 50 V by means of a transformer "Slidac") for 30 minutes, after which the temperature was elevated to 70° C. to initiate the polymerization. With progress of polymerization, the viscosity of the mixture increased until stirring became difficult, when Component V was added to ensure smooth stirring and to transform the polymerization into suspension polymerization. Subsequently, the temperature was maintained at 80° C. for 2 hours and at 90° C. for 3 hours to complete the polymerization, after which the mixture was dehydrated and dried to obtain a powder. The powder was milled and extruded into pellets, which were then injection molded at 240° C. under a molding pressure of 90 kg/cm². The injection molded pieces were tested for characteristic properties according to the testing methods specified in JIS (an abbreviation of Japanese Industrial Standards) and ASTM. The rubber latex [A] was added dropwise to a mixture of isopropanol and water (3:1) to be coagulated. The coagulum was washed and dried to obtain a solid matter which was immersed in acetone while stirring for 24 hours to dissolve the soluble matter. The insoluble residue was isolated by means of a high speed centrifuge to determine the insoluble matter content. The insoluble matter was further immersed in butyl acrylate monomer at 20° C. for 24 hours to be swollen, and then weighed to measure the degree of swelling. The dehydrated powder obtained from graft-polymerization was extracted with acetone used as a solvent in a Soxhlet extractor for 24 hours to obtain the insoluble matter. The acrylonitrile content of the insoluble matter was determined. The percentage of graft was calculated from the following equation, taking the charged ratio into account.

$$\text{Percentage of graft} = \frac{\text{Weight of grafted monomer contained in soluble matter of resin}}{\text{Weight of total monomer charged in graft polymerization}} \times 100$$

Referential Example 1

Components III and IV were changed in composition as mentioned hereunder and using these components, emulsion polymerization was carried out. After completion of the polymerization, the resulting polymer was salted out, dehydrated and dried in a conventional manner to obtain a powder. Other procedures were similar to those in Example 1.

| Component III | | |
|---|---|---|
| Partially hydrolyzed polyvinyl alcohol (KH-17) | 0 | part |
| Sodium oleate | 6.0 | parts |
| Deionized water | 900 | " |
| Rongalite | 2.1 | " |
| Component IV | | |
| Styrene | 450 | parts |
| Acrylonitrile | 150 | " |
| Lauroyl peroxide | 0 | part |
| tert-Dodecyl mercaptan | 1.5 | parts |
| Cumene hydroperoxide | 2.1 | " |

Referential Example 2

By using the same mixing ratio as in Example 1, a rubber latex [A] was obtained from Components I and II, and a poly(styrene-acrylonitrile) latex [B] was obtained from Components III and IV. These two latices were blended to obtain a resin composition. Other treatments were carried out in the same manner as in Example 1. The results obtained in Example 1, and Referential Examples 1 and 2 were as shown in Table 1.

Table 1

| | Polymerization type | Mechanical property | | | | Moldability * |
|---|---|---|---|---|---|---|
| | | Notched Izod impact value (kg.cm/cm) | Tensile strength (kg/cm²) | Tensile modulus (kg/cm²) | Rate of flow ($\times 10^{-3}$ cm³/sec) | |
| Example 1 | Emulsion suspension polymerization (present process) | 28 | 450 | 24,000 | 2.5 | o |
| Referential Example 1 | Emulsion polymerization | 8.0 | 430 | 22,000 | 3.0 | x |
| Referential Example 2 | Latex blend | 4.5 | 420 | 22,000 | 4.5 | x |
| Testing method | — | ASTM D 256 | JIS K 6361 | JIS K 6301 | Koka type flow tester, 200° C., 20 kg, nozzle 1 φ × 2 mm | — |

Note:
*x: Delamination and weld line observed
o : Good

EXAMPLE 2

The same components as in Example 1 were mixed by means of T. K. Homomixer under varied conditions to examine relationships between the phase separation rate as well as the viscosity and the impact strength of the resin obtained (Table 2). The phase separation rate referred to herein was expressed in terms of the percentage of the aqueous phase formed by phase separation after the mixture was allowed to stand for 2 hours. The viscosity was measured by means of a B.L-type rotating viscosimeter using a No. 2 rotor at 60 rpm. Other mixing conditions were similar to those in Example 1. It is seen from Table 2 that the phase separation rate becomes minimum at an intensity of 50 V, and the particles are most stably dispersed. The impact strength also shows the maximum value under such conditions.

The viscosity increased in proportion to the intensity of mixing. This is because dispersion is insufficient at low intensities of mixing, while rather agglomeration occurs at too high intensities. The optimum results were obtained at intermediate intensities.

Table 2

| No. | Intensity of mixing (V) | Duration of mixing (min) | Rate of phase separation (%) | Viscosity (cps) | Notched Izod impact value (kg.cm/cm) |
|---|---|---|---|---|---|
| 2-1 | 30 | 10 | 20.0 | 9.3 | 9.5 |
| 2-2 |    | 30 | 17.5 | 8.5 | 8.3 |
| 2-3 | 50 | 10 | 5.5 | 20.0 | 23 |
| 2-4 |    | 30 | 2.5 | 15.3 | 28 |
| 2-5 | 70 | 10 | 8.5 | 61.3 | 18 |
| 2-6 |    | 30 | 7.0 | 68.3 | 16 |
| 2-7 | 90 | 10 | 12.0 | 134 | 10 |
| 2-8 |    | 30 | 16.0 | 103 | 8.5 |

EXAMPLE 3

Of the components in Example 1, the type of the organic polyfunctional compounds to be copolymerized with the acrylic ester was varied, and the characteristic properties of the graft copolymers derived therefrom were examined (Table 3). The mixing conditions were otherwise similar to those in Example 1.

Table 3

| | Physical properties of rubbery copolymer | | | Percentage of graft (%) | Mechanical characteristics of graft copolymer | | |
|---|---|---|---|---|---|---|---|
| | Rate of flow (Koka-type flow tester) (× 10⁻³ cm³/sec) | Degree of swelling | Insoluble matter (%) | | Notched Izod impact value (kg.cm/cm) | Tensile strength (kg/cm²) | Tensile modulus (kg/cm²) |
| Triallyl isocyanurate | 0–0.8 | 7–9 | ~100 | 10–15 | 28 | 450 | 24,000 |
| Divinylbenzene | 16 |  | Trace | 0 | 5.2 | 310 | 16,000 |
| Dicyclopentadiene methacrylate | 5.0 | 10–12 | 75 | 5 | 10 | 390 | 21,000 |
| Ethylene glycol dimethacrylate | 14 | 15 | 72 | ~0 | 4.8 | 350 | 17,000 |
| Diethylene glycol dimethacrylate | 10 | 15 | 70 | ~0 | 4.6 | 360 | 16,000 |
| Triethylene glycol dimethacrylate | 13 | 14 | 70 | ~0 | 3.7 | 340 | 17,000 |
| Tetraethylene glycol dimethacrylate | 11 | 15 | 70 | ~0 | 4.0 | 350 | 18,000 |
| Tetradecaneethylene glycol dimethacrylate | 10 | 15 | 70 | ~0 | 2.6 | 360 | 17,000 |
| Triallyl cyanurate | 2–3 | 10 | 92 | 5–10 | 22 | 410 | 22,000 |
| Diallyl phthalate | 4–5 | 12 | 85 | 5 | 14 | 400 | 21,000 |
| Diallyl isophthalate | 4.5 | 12 | 83 | 0–5 | 12 | 380 | 21,000 |
| Diallyl terephthalate | 4.0 | 11 | 80 | 0–5 | 11 | 380 | 20,000 |
| Triallyl trimellitate | 3.5 | 10–12 | 85 | 0–5 | 14 | 390 | 21,000 |
| Triallyl pyromellitate | 4.0 | 12 | 80 | 0–5 | 12 | 400 | 21,000 |
| Tetraallyl pyromellitate | 3.8 | 10–12 | 80 | 0–5 | 12 | 380 | 21,000 |
| Diallyl maleate | 4.5 | 12 | 82 | 0–5 | 13 | 400 | 22,000 |
| No crosslinking agent | 30 | — | 0 | 0 | 2.5 | 280 | 14,000 |

Note:
1. Rate of flow: Koka type flow tester (plunger type flow tester), 10 × 2 mm nozzle, 200° C., 20 kg
2. Conditions for synthesis: Rubber content, 18%; St/AN = 3/1; Other conditions were similar to Example 1.

EXAMPLE 4

The solids content of a butyl acrylate rubber latex [A] prepared in accordance with the recipe in Example 1 was adjusted to 22% (Example 4-1), 15% (Example 4-2), and 12% (Example 4-3), and graft copolymerization was effected using the latex. Other conditions for treatments were similar to those in Example 1. The results obtained are shown in Table 4.

Table 4

| | Mechanical Characteristics | | | | |
|---|---|---|---|---|---|
| | Amount of rubber (% by wt) | Notched Izod impact value (kg.cm/cm) | Tensile strength (kg/cm²) | Tensile modulus (kg/cm²) | Rate of flow (Koka type flow tester) (× 10⁻³ cm³/sec) |
| Example 4-1 | 22 | 40 | 400 | 21,000 | 2.0 |
| Example 1 | 18 | 28 | 450 | 25,000 | 2.5 |
| Example 4-2 | 15 | 16 | 470 | 26,000 | 3.0 |
| Example 4-3 | 12 | 12 | 490 | 29,000 | 3.0 |

EXAMPLE 5

Elastomer latices [A] were synthesized in accordance with the recipe in Example 1, except that the amount of triallyl isocyanurate in Component II was changed to 1% by weight (Example 5-1), and 5% by weight (Example 5-2). Components III and IV were graft-copolymerized on the latices [A], the solids content of which were both 18% by weight. Other treatments were similar to those in Example 1. The result obtained are shown in Table 5.

Table 5

| | Amount of triallyl isocyanurate (% by wt) | Notched Izod impact value (kg.cm/cm) | Tensile strength (kg/cm²) | Tensile modulus (kg/cm²) | Rate of flow (Koka type flow tester) (× 10⁻³ cm³/sec) |
|---|---|---|---|---|---|
| Example 5-1 | 1.0 | 18 | 410 | 21,000 | 3.0 |
| Example 1 | 2.0 | 28 | 450 | 25,000 | 2.5 |
| Example 5-2 | 5.0 | 22 | 470 | 28,000 | 3.0 |

EXAMPLE 6

Component IV in the recipe in Example 1 was replaced by the undermentioned. Other components were the same as in Example 1.

| Component IV | Styrene | 38 | parts |
|---|---|---|---|
| | Acrylonitrile | 169 | " |
| | Methyl methacrylate | 93 | " |
| | Lauroyl peroxide | 1.8 | " |
| | tert-Dodecyl mercaptan | 1.5 | " |
| | Cumene hydroperoxide | 2.1 | " |

The results obtained are shown in Table 6.

Table 6

| | Composition of resin (%) | | | Mechanical characteristics | | | |
|---|---|---|---|---|---|---|---|
| | Styrene | Acrylonitrile | Methyl methacrylate | Notched Izod impact value (kg.cm/cm) | Tensile strength (kg/cm²) | Tensile modulus (kg/cm²) | Rate of flow (Koka type flow tester) (× 10⁻³ cm³/sec) |
| Example 6 | 56.4 | 28.1 | 15.5 | 20 | 450 | 25,000 | 3.5 |
| Example 1 | 75 | 25 | 0 | 28 | 450 | 25,000 | 2.5 |

EXAMPLE 7

Acrylonitrile was added as a third component to Component II in Example 1 for use in copolymerization. Other conditions were the same as in Example 1. The results obtained are shown in Table 7.

| Component II | | |
|---|---|---|
| Example 7-1 | | |
| Butyl acrylate | 744 | parts |
| Acrylonitrile | 40 | " |
| Triallyl isocyanurate | 15.2 | " |
| Example 7-2 | | |
| Butyl acrylate | 704 | parts |
| Acrylonitrile | 80 | " |
| Triallyl isocyanurate | 15.2 | " |
| Example 7-3 | | |
| Butyl acrylate | 664 | parts |
| Acrylonitrile | 120 | " |
| Triallyl isocyanurate | 15.2 | " |

Table 7

| | Amount of acrylonitrile in rubber component (% by wt) | Mechanical Characteristics | | | Moldability * |
|---|---|---|---|---|---|
| | | Notched Izod impact value (kg.cm/cm) | Tensile strength (kg/cm²) | Rate of flow (Koka type flow tester) (× 10⁻³ cm³/sec) | |
| Example 1 | 0 | 28 | 450 | 2.5 | o |
| Example 7-1 | 5 | 25 | 450 | 2.5 | o |
| Example 7-2 | 10 | 30 | 460 | 2.0 | Δ |
| Example 7-3 | 15 | 33 | 480 | 1.0 | Δ |

Note: *Moldability
Δ: Delamination; some weld lines
o : Good (no delamination; no weld line detected.)

EXAMPLE 8

An outdoor exposure test was conducted on test specimens obtained in Example 1 to confirm weather resistance. The test specimens were fixed on a panel facing south and at 45° from horizontal and exposure was continued for a period extending from March to September. The exposed specimens were tested by the Izod impact testing method for unnotched specimens, the impact being applied on the exposed side of the test specimens. The results obtained are shown in Table 8.

Table 8

| | | Unnotched Izod impact value (kg.cm/cm) after exposure and percentage retention (%) | | | | | |
|---|---|---|---|---|---|---|---|
| | Exposure days | 0 (initial value) | 10 days | 20 days | 1 month | 3 months | 6 months |
| Sample (this invention) | Impact value | 150 | 160 | 155 | 150 | 152 | 148 |
| | % Retention | — | 107 | 103 | 100 | 101 | 98 |
| ABS* | Impact value | 114 | 52 | 15 | 18 | 21 | 15 |
| | % Retention | — | 46 | 13 | 16 | 19 | 13 |
| ABS** | Impact value | 73 | 63 | 13 | 14 | 13 | 13 |

Table 8-continued

| Exposure days | Unnotched Izod impact value (kg.cm/cm) after exposure and percentage retention (%) | | | | |
|---|---|---|---|---|---|
| | 0 (initial value) | 10 days | 20 days | 1 month | 3 months | 6 months |
| % Retention | — | 86 | 18 | 19 | 18 | 18 |

Note:
*MHA MHA resin, Sumitomo Bakelite Co.
**JSR-35 resin, Japan Synthetic Rubber Co.

EXAMPLE 9

The same procedures as in Example 1 were repeated except that ethyl acrylate and n-octyl acrylate were substituted for the butyl acrylate in Component II to obtain the results shown in Table 9.

Table 9

| | Kind of acrylate | Notched Izod impact value (kg.cm/cm) | Tensile strength (kg/cm²) | Tensile modulus (kg/cm²) | Moldability |
|---|---|---|---|---|---|
| Example 7 | Ethyl acrylate | 18 | 420 | 26,000 | o |
| | n-Octyl acrylate | 20 | 320 | 20,000 | Δ |
| Example 1 | n-Butyl acrylate | 28 | 450 | 24,000 | o |

What is claimed is:

1. A process for producing a thermoplastic resin having high impact and weather resistance and having good rigidity and good moldability, said process comprising forming a latex (A) by polymerizing (I) 0.1 to 10% by weight of a polyalkyl compound, (II) 60 to 99.9% by weight of at least one alkyl acylate having 1 to 13 carbon atoms in the alkyl group, and (III) 0 to 30% by weight of at least one vinyl or vinylidene compound copolymerizable with (II) to obtain said copolymer latex (A), and graft copolymerizing 10 to 40% by weight of a copolymer latex (A) based on the solids content of copolymer latex (A) and 90 to 60% parts by weight of a monomer mixture (B) comprising 30 to 100% by weight of an aromatic vinyl monomer and 0 to 70% by weight of acrylonitrile plus methyl methacrylate in which the proportion of acrylonitrile is 20 to 100% by weight and the proportion of methyl methacrylate is 0 to 80% by weight, graft copolymerization being accomplished in the presence of a water-soluble polymer and a radical polymerization initiator, the polymerization system being subjected prior to graft copolymerization to a mechanical treatment for causing swelling of the latex particles of copolymer latex (A) with monomer mixture (B).

2. A process according to claim 1, wherein the alkyl acrylate is butyl acrylate.

3. A process according to claim 1, wherein the organic polyallyl compound is triallyl isocyanurate, triallyl cyanurate, diallyl phthalate, diallyl isophthalate, diallyl terephthalate, triallyl trimellitate, diallyl trimellitate, tetraallyl pyromellitate, triallyl pyromellitate, diallyl pyromellitate, diallyl maleate, diallyl fumarate, or diallyl adipate.

4. A process according to claim 1, wherein the organic polyallyl compound is triallyl isocyanurate.

5. A process according to claim 1, wherein the water-soluble polymer is methylcellulose, carboxymethylcellulose, hydroxyethylcellulose, polyvinyl alcohol, partially hydrolized polyvinyl alcohol, sodium polyacrylate or polyacrylic acid.

6. A process for producing a thermoplastic polymer highly resistant to impact and weather comprising graft-copolymerizing in an aqueous medium in the presence of a water soluble polymer and a radical polymerization initiator 90 to 60 parts by weight of (B) a monomer mixture comprising 30 to 100% by weight of an aromatic vinyl compound, 0 to 70% by weight of acrylonitrile plus methyl methacrylate in which the proportion of acrylonitrile is 20 to 100%

7. A process according to claim 6, wherein the aromatic vinyl group in monomer mixture is styrene, α-methylstyrene, α-ethylstyrene, vinyl toluene, or chlorostyrene.

8. A process according to claim 6, wherein the monomer mixture is a mixture of styrene and acrylonitrile or a mixture of styrene, acrylonitrile and methyl methacrylate. 6

9. A process for producing a thermoplastic resin having high resistance to impact and weather and having good rigidity and good moldability, characterized by polymerizing (I) 0.5 to 10% by weight of triallyl isocyanurate, (II) 60 to 99.5% by weight of at least one alkyl acrylate having 1 to 13 carbon atoms in the alkyl group and (III) 0 to 35% by weight of at least one vinyl compound copolymerizable with (II) to obtain a copolymer latex (A), and graft-copolyermizing a reaction mixture containing 10 to 40% by weight, solids content, of the copolymer latex (A) and 90 to 60% by weight of a monomer mixture (B) consisting essentially of 30 to 100% by weight of an aromatic vinyl monomer, 0 to 40% by weight of acrylonitrile and 0 to 60% by weight of a methacrylate, in the presence of a partially saponified polyvinyl alcohol with a radical polymerization initiator, in which prior to effecting the graft-polymerization, the reaction mixture and the partially saponified polyvinyl alcohol are subjected to mechanical mixing and the fraft-copolymerization is changed from emulsion polymerization to suspension polymerization during the progress of the copolymerization.

10. A process according to claim 6, wherein the monomer mixture contains said aromatic vinyl compound, acrylonitrile and methyl methacrylate.

11. A process according to claim 6, wherein (B) consists of said aromatic vinyl compound.

12. A process according to claim 6, wherein the monomer mixture contains the aromatic vinyl compound and acrylonitrile.

13. A two-step process for producing a thermoplastic resin having high impact and weather resistance and having good rigidity and good moldability, said process comprising
    forming a latex of a rubbery polymer by copolymerizing in an aqueous medium 60 to 99.9% by weight of at least one alkyl acrylate in which the alkyl group has 1 to 13 carbon atoms, 40 to 0.1% of a crosslinking agent consisting essentially of a polyallyl compound and 0 to 30% by weight of at least one vinyl compound copolymerizable with said alkyl acrylate, forming a graft copolymerization system containing 10 to 40% by weight of said rubbery polymer latex based on the solids content of said latex and 90 to 60% by weight of a comonomer mixture consisting essentially of 30 to 100% by weight of an aromatic vinyl monomer and 0 to 70% by weight of acrylonitrile and methyl methacrylate in which the proportion of acrylonitrile is 20 to 100% by weight and the proportion of methyl methacrylate is 0 to 80% by weight adding a water-soluble polymer to said graft copolymerization system, mechanically mixing the graft copolymerization system containing said water-soluble polymer and effecting graft copolymerization of said rubbery polymer latex with said comonomer mixture in the presence of said water-soluble polymer to produce said thermoplastic resin.

14. A process according to claim 13, wherein an additional amount of a water-soluble polymer is added to the graft copolymerization system after the conversion reaches about 70 to 80% and polymerization changes from emulsion polymerization to suspension polymerization.

15. A process according to claim 14, wherein the graft copolymerization system undergoing graft copolymerization is also subjected to mechanical mixing during the suspension polymerization.

16. A process according to claim 15, wherein the mechanical mixing is begun prior to initiation of graft copolymerization and continued until after the additional amount of water-soluble polymer is added for promoting said suspension polymerization.

17. A process according to claim 13, wherein the water-soluble polymer added prior to the initiation of graft copolymerization is selected from the group consisting of methylcellulose, carboxymethylcellulose, hydroxyethycellulose, polyvinyl alcohol, partially hydrolyzed polyvinyl alcohol, sodium polyacrylate, polyacrylic acid and mixtures thereof.

18. A process according to claim 13, wherein the amount of water soluble polymer added prior to the initiation of graft copolymerization is about 0.05 to 5% by weight based on the weight of the monomers.

19. A process according to claim 13, wherein the system undergoing graft copolymerization is subjected to mixing in order to stably disperse the emulsion particles.

20. A process according to claim 13, wherein the rubbery copolymer contains about 0.1 to 20% by weight of polymerized polyallyl compound.

21. A process according to claim 20, wherein said rubbery copolymer contains about 0.5 to 10% by weight of polymerized polyallyl compound.

22. A process for the production of a thermoplastic resin having high impact and weather resistance and having good rigidity and good moldability comprising:

forming a rubbery copolymer latex by polymerizing 60 to 99.9% by weight of at least one alkyl acrylate having 1 to 13 carbon atoms in the alkyl group, 0.1 to 40% by weight of a cross-linking agent comprising a polyallyl compound and 0 to 30% by weight of at least one vinyl compound copolymerizable with said alkyl acrylate, forming a homogeneous mixture of (a) a comonomer mixture comprising 30 to 100% by weight of an aromatic vinyl monomer and 0 to 70% by weight of acrylonitrile plus methyl methacrylate in which the proportion of acrylonitrile is 20 to 100% by weight and the proportion of methyl methacrylate is 0 to 80% by weight and (b) a water-soluble polymer, the amount of water-soluble polymer being 0.5 to 5% by weight based on the weight of the monomers, mechanically mixing said rubbery polymer latex with said homogeneous mixture to form a graft copolymerization system, heating said graft copolymerization system to cause graft copolymerization of said rubbery polymer and said comonomer mixture, said graft copolymerization system being further mixed during polymerization for the prevention of inter-particle agglomeration, and causing polymerization to transform from emulsion polymerization to suspension polymerization when inter-particle agglomeration begins to take place.

23. A process according to claim 22, wherein the transformation from emulsion polymerization to suspension polymerization is followed by the further addition of a water-soluble polymer to the graft copolymerization system.

24. A process for producing a thermoplastic polymer highly resistant to impact and weather comprising graft copolymerizing in an aqueous medium in the presence of a water-soluble polymer and a radical polymerization initiator 90 to 60 parts by weight of a monomer mixture (B) consisting essentially of 30 to 100% by weight of an aromatic vinyl compound and 0 to 70% by weight of acrylonitrile on 10 to 40 parts by weight in terms of solids content of a rubbery copolymer latex (A) obtained by copolymerizing in an aqueous medium a mixture consisting essentially of (I) 60 to 99.9% by weight of at least one alkyl acrylate in which the alkyl has 1 to 13 carbon atoms, (II) 0 to 20% by weight of at least one vinyl compound copolymerizable with (I), and (IV) 0.1 to 20% by weight of at least one organic polyallyl compound copolymerizable with (I), said process further comprising subjecting the polymerization system prior to graft copolymerization to a mechanical treatment for causing swelling of the latex particles of copolymer latex (A) with monomer mixture (B).

* * * * *